UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS OF MAKING ALKALI PERBORATES.

No. 842,471.     Specification of Letters Patent.     Patented Jan. 29, 1907.

Original application filed February 7, 1906, Serial No. 299,901. Divided and this application filed October 26, 1906. Serial No. 340,686.

*To all whom it may concern:*

Be it known that I, OTTO LIEBKNECHT, a subject of the German Emperor, and a resident of Frankfort-on-the-Main, Germany, have invented a certain new and useful Process of Making Alkali Perborates, of which the following is a specification and which is a division of my application, Serial No. 299,901, filed February 7, 1906.

My invention relates to a new process of making alkali perborates which has proved easy in operation and of a high degree of efficiency. I have discovered that if an alkali peroxid, such as sodium peroxid, in solution or in suspension in water is treated with boracic acid and carbonic acid a perborate is formed and precipitated in an alkaline solution. As a result of my process besides the perborate a pure concentrated solution of carbonate is obtained which can be used for other purposes.

In the following I have described one illustrative method of carrying out the process as applied to the manufacture of sodium perborate, the features thereof being more particularly pointed out hereinafter in the claims.

Six hundred and thirty parts of boracic acid are stirred into four thousand parts of water and then seven hundred and eighty parts of sodium peroxid are added, together with sufficient ice, so that no increase in temperature takes place. Then carbonic acid or dust-free waste gases containing carbonic acid are passed into the mixture until fifty cubic centimeters of a filtered sample discolors but five to ten cubic centimeters of a one-fifth normal potassium permanganate solution after an addition of sulfuric acid.

The reaction of the illustrative process set forth is

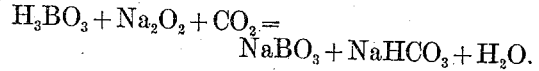

$$H_3BO_3 + Na_2O_2 + CO_2 = NaBO_3 + NaHCO_3 + H_2O.$$

A surplus of carbonic acid is not harmful, as the same does not decompose the already-formed perborate. It will be of advantage to stir during the entire operation. When the reaction is completed, the precipitate of perborate is separated from the sodium carbonate solution, washed out, and dried in the usual manner.

It is obvious that the process as described may be varied without departing from the spirit of the invention and that the proportions stated are merely illustrative. For instance, sodium peroxid may be replaced by other alkali peroxid, such as sodium potassium peroxid or potassium peroxid, as long as there is enough alkali in the form of a salt present to produce perborate as a result of the reaction.

What I claim, and desire to secure by Letters Patent, is—

1. The process of making alkali perborates which consists in reacting on boracic acid with an alkali peroxid and carbon dioxid.

2. The process of making sodium perborate which consists in reacting on boracic acid with sodium peroxid and carbon dioxid.

In witness whereof I have hereunto signed my name in the presence of two subscribing witnesses.

OTTO LIEBKNECHT.

Witnesses:
   HORST ZIEGLER,
   JEAN GRUND.